United States Patent [19]

Kinman

[11] 4,367,149

[45] Jan. 4, 1983

[54] WATER PURIFICATION PROCESS

[75] Inventor: Riley N. Kinman, Erlanger, Ky.

[73] Assignee: R.N.K. Environmental, Inc., Covington, Ky.

[21] Appl. No.: 281,490

[22] Filed: Apr. 8, 1981

Related U.S. Application Data

[63] Continuation of Ser. No. 169,859, Jul. 17, 1980, abandoned.

[51] Int. Cl.³ .............................................. C02F 1/76
[52] U.S. Cl. .................................. 210/753; 210/764; 210/916; 210/917
[58] Field of Search ............... 210/753, 764, 757, 916, 210/917, 754, 755, 756, 702, 719

[56] References Cited

U.S. PATENT DOCUMENTS

| | | | |
|---|---|---|---|
| 1,968,114 | 7/1934 | Windecker | 210/916 |
| 2,250,345 | 5/1937 | Allison | 210/916 |
| 3,408,295 | 10/1968 | Vaichulis | 210/753 |
| 3,414,515 | 12/1968 | Mehltretter | 210/917 |
| 3,772,189 | 11/1973 | Kreusch | 210/753 |
| 3,926,802 | 12/1975 | Hedgpeth | 210/917 |
| 4,022,882 | 5/1977 | Ely | 210/753 |
| 4,119,537 | 10/1978 | Finkelstein | 210/764 |
| 4,155,975 | 5/1979 | Riley | 210/916 |

FOREIGN PATENT DOCUMENTS

| | | | |
|---|---|---|---|
| 1938735 | 2/1970 | Fed. Rep. of Germany | 210/916 |
| 1396210 | 6/1975 | United Kingdom | 210/916 |

*Primary Examiner*—Ernest G. Therkorn
*Attorney, Agent, or Firm*—James D. Liles

[57] ABSTRACT

Iodine has long been known for its bactericidal, viricidal and cysticidal activities. Recently it has been attracting attention as an agent in water purification. Water purified with iodine is nevertheless subject to some objections. Because of its displeasing appearance iodine treated water is esthetically unacceptable. In the case of drinking water, color, odor and taste of water purified with iodine are even more detracting. The process herein overcomes these disadvantages, yet iodine, with its germicidal advantages, can still be used.

3 Claims, No Drawings

WATER PURIFICATION PROCESS

This is a continuation of application Ser. No. 169,859, filed on Jul. 17, 1980, now abandoned.

BACKGROUND OF THE INVENTION

This invention in one of its aspects relates to the purification of water for drinking. In another of its aspects the invention pertains to a kit for travelers and campers for use on an individual basis for purifying water.

Iodine has been known a long time for its bactericidal, viricidal and cysticidal activities. In view of such germicidal action it is now attracting attention as an agent in water purification. In U.S. Pat. No. 3,414,515, for instance, it is pointed out swimming pools can be disinfected with iodine instead of chlorine. In U.S. Pat. No. 3,772,189 it can be found that activated carbon, utilized in numerous water treating applications, becomes bacteriostatic when treated with iodine.

Iodine has also been used to purify drinking water. As expressed in U.S. Pat. No 3,408,295 the use of iodine to purify water has not been adequately exploited because of certain problems in producing solutions of iodine simply and inexpensively. A purification apparatus is described in the form of a container having a fixed bed of iodine crystals. Water is passed through the bed of crystals, dissolving a small amount of iodine, which functions as a plurifying agent. The purified water is then passed through a porus body impervious to the passage of iodine in an undissolved form.

U.S. Pat. No. 3,408,295 provides a desirable process for purifying water in a short time for domestic and in the field uses. However, water purified with iodine is nevertheless subject to some objections. In U.S. Pat. No. 3,926,802, for example, the point is made that attempts to utilize elemental iodine for the purpose of decontaminating swimming pools have not met with widespread acceptance due to the fact that the water becomes displeasing in appearance. In U.S. Pat. No. 3,414,515 it is stated that iodine treated water is esthetically unacceptable. The same is true in the case of drinking water. Color, odor and taste of water purified with iodine are even more detracting.

This invention provides a process which overcomes these disadvantages. Yet by the invention iodine, with its germicidal advantages, can still be used. In addition a water purification kit is provided for use in the field.

SUMMARY OF THE INVENTION

In accordance with the practice of this invention a process for purifying water is provided which renders it more potable than the usual halogen purified water. Iodine is added to the water to be purified in an amount sufficient to kill the bacteria in the water. After sufficient time is allowed for germicidal activity, the iodine is reacted with a stoichiometric amount of sodium or potassium thiosulfate. This reaction, by tying up the elemental iodine, eliminates the color, odor and iodine taste objections of the prior art, thereby rendering the water more potable.

DETAILED DESCRIPTION OF THE INVENTION

An addition of iodine to water HOI is formed, thus there will be approximately 50 percent $I_2$ and 50 percent HOI present in the water at pH 7.0.

$$I_2 + H_2O \rightleftharpoons HOI + H^+ + I^-.$$

$I_2$ is a particularly desirable bactericide, and in addition, HOI is an effective viricide. There are, therefore, cogent reasons for using iodine in water purification. In order to eliminate the problem of water coloration, the approach has previously been the utilization of iodine complexes. Such complexes as mixtures of cuprous iodine and copper carbonate, or the iodine complex of a hydroxyalkyl ether of amylene have been employed. Such complexes would, of course, not be suitable in the case of drinking water due to the toxicity of the copper and organics to humans.

By this invention sodium thiosulfate is employed rather than an iodine complexing agent. By means of sodium thiosulfate free iodine is eliminated, or, in the broad sense, neutralized, by conversion to sodium iodide. The iodine now has no odor or taste, and it confers no color on the water. Rather the iodine is in the consumable form used by those desiring it in their diets. This invention thus provides a process for purifying impure water for drinking by using iodine in a quantity which will kill pathogens. But after time has been allowed for the pathogenicidal action, usually 5 to 10 minutes, a stoichiometric amount of sodium thiosulfate is added.

The concentration of iodine which will be needed as a germicide will be between 2 and 25 milligrams iodine per liter of water, preferably 20 milligrams per liter. Having been given the concentration, the conversion can be made for the quantity of water to be treated. The amount of sodium thiosulfate, then, will be that which will react with the $I_2$ so that neither is in excess.

Whereas this invention can be used on a large scale, in our preferred embodiment the invention is in kit form. In this form there is a provision for adding to a glass of water, say, 8 fluid ounces (236.5 ml), an amount of iodine sufficient to purify the water in the glass. This form of the invention contemplates two vials, one containing an iodine solution, and the other one containing a sodium thiosulfate solution. Dispensing means are provided for withdrawing measured amounts of each chemical required for addition to the glass of water. Since iodine is only slightly water soluble one vial will contain a tincture of iodine. The other vial will contain an aqueous solution of sodium thiosulfate. We will now consider a specific example.

EXAMPLE

To a squeeze bottle or other medicine bottle adapted to accurately dispense 2 drops (0.1 ml), a solution of iodine is added. The solution contains a tincture of iodine in a concentration of 2 percent. When 2 drops of this iodine solution are added to a 6 oz glass of water (177 ml), the concentration of iodine in the water, on a liter basis, is 20 mg iodine/liter water. The 6 oz glass of water actually contains 3.54 mg iodine. This concentration kills all pathogens in the water in 10 minutes.

A second bottle is prepared so that it contains an aqueous solution of sodium thiosulfate in a concentration of 2.5 percent. This concentration is such that two drops of the sodium thiosulfate solution react with 3.54 mg iodine with no sodium thiosulfate in excess.

This invention thus provides an easy to carry water purification kit, convenient for travelers, campers, and the like. The iodine and sodium thiosulfate in the disinfection and iodine conversion bottles, or vials, are of such concentrations that equal amounts of iodine and thiosulfate solutions both purify the water, and react with each other without excess. In addition the kit can be prepared from reagent grade chemicals, and the reagents have long shelf lives. The kit is safe to use and it provides protection no matter what organisms are present in the untreated water. It has been field tested in Asia, Mexico, Europe and the United States. In addition an overdose of the reagents will not be fatal to a person even if the entire contents of the vials are consumed.

In the light of the foregoing, other advantages and ramifications of the invention will occur to those skilled in the art. For example if more than two drops of the iodine solution are added to the water, the same quantity of sodium thiosulfate solution can be used. Further, for the purpose of the invention potassium thiosulfate is an equivalent of sodium thiosulfate. Potassium iodide is also a source of iodine in the diet. In addition, to make the kit convenient a pouch or carrying case can be provided for the vials.

When necessary the iodine solution can be used as a surface antiseptic for cuts, wounds, and so forth. Moreover if the iodine solution is spilled on clothes its stain can be removed with the sodium thiosulfate solution. These and other modifications and variations which will occur to those in the art are deemed to be within the scope of this invention.

What is claimed is:

1. A process for purifying water which improves its potability over usual halogen purified water comprising adding to said water an amount of iodine which will kill pathogens therein, allowing sufficient time for pathogenicidal activity, and then reacting the iodine with a stoichiometric amount of sodium or potassium thiosulfate to convert the iodine to sodium or potassium iodide thereby eliminating elemental iodine from the water rendering the water more potable.

2. The process of claim 1 wherein the iodine is a tincture, wherein sufficient tincture is used to provide a concentration of 2 to 25 milligrams iodine per liter of water, and wherein the sodium or potassium thiosulfate is in the form of an aqueous solution.

3. The process of claim 2 wherein the concentration of the iodine tincture is such that less than 0.2 milliliters when added to 236.5 milliters (8 oz) water results in an iodine concentration of 20 mg iodine per liter water, wherein the thiosulfate solution is sodium thiosulfate, and wherein the concentration of the sodium thiosulfate solution is such that a volume of thiosulfate equal to the volume of iodine solution contains the stoichiometric quantity of sodium thiosulfate.

* * * * *